United States Patent [19]

Tabuchi

[11] 3,940,800
[45] Feb. 24, 1976

[54] MODE SELECTING DEVICE HAVING A TIME DELAY BETWEEN SELECTION AND ESTABLISHMENT OF AN OPERATING MODE FOR TAPE RECORDING AND/OR RECORDING APPARATUS

[75] Inventor: Hideo Tabuchi, Tokyo, Japan
[73] Assignee: Sony Corporation, Tokyo, Japan
[22] Filed: May 24, 1974
[21] Appl. No.: 473,188

[30] Foreign Application Priority Data
June 9, 1973  Japan............... 48-68405[U]

[52] U.S. Cl. ............... 360/137; 335/165; 360/60; 360/61
[51] Int. Cl.² ............ G11B 15/02; G11B 19/02; G11B 15/04; H01H 9/20
[58] Field of Search ............... 360/60–62, 360/69, 71, 137; 197/107; 335/159, 160, 164, 165; 235/145

[56] References Cited
UNITED STATES PATENTS

| | | | |
|---|---|---|---|
| 3,091,320 | 5/1963 | Mertin | 197/107 |
| 3,494,051 | 2/1970 | Kobler | 197/107 |
| 3,689,077 | 9/1972 | Omira | 360/60 |
| 3,700,087 | 10/1972 | Amrns et al. | 197/107 |
| 3,705,367 | 12/1972 | Peil et al. | 197/107 |
| 3,735,054 | 5/1973 | Posmimura | 360/69 |
| 3,747,090 | 7/1973 | Englund et al. | 197/107 |
| 3,752,938 | 8/1973 | Ozawa | 360/60 |
| 3,800,327 | 3/1974 | Okita et al. | 360/60 |

Primary Examiner—Robert S. Tupper
Attorney, Agent, or Firm—Lewis H. Eslinger; Alvin Sinderbrand

[57] ABSTRACT

In a tape recording and/or reproducing apparatus in which various operating modes thereof are selected by selective actuation of corresponding push-buttons and the actual force for establishing the selected operating mode is derived from an electrically energized driver, such as a solenoid; the energizing of the driver in response to actuation of any one of the mode selecting push-buttons is delayed for a predetermined time following such actuation so that in the event of the fairly rapid, successive actuation of two or more of the push-buttons, the driver is energized only when the predetermined time has elapsed after the last actuation to establish only the operating mode corresponding to the last actuated push-button for avoiding damage to, or malfunction of the apparatus. Further, the presence and absence of a tape cassette on the apparatus is detected and energizing of the driver is permitted no sooner than the previously mentioned predetermined time after the presence of a cassette is detected, so as to avoid damage to the cassette and/or to a magnetic head or heads of the apparatus in the event that the push-button for selecting the normal forward, that is recording or reproducing, operating mode of the apparatus is actuated without a cassette positioned thereon. Finally, a pause control is provided for temporarily halting the transport of the tape when the apparatus is in its normal forward operating mode, and, when the pause control is actuated, energizing of the driver is permitted only with the apparatus in its normal forward operating mode.

14 Claims, 8 Drawing Figures

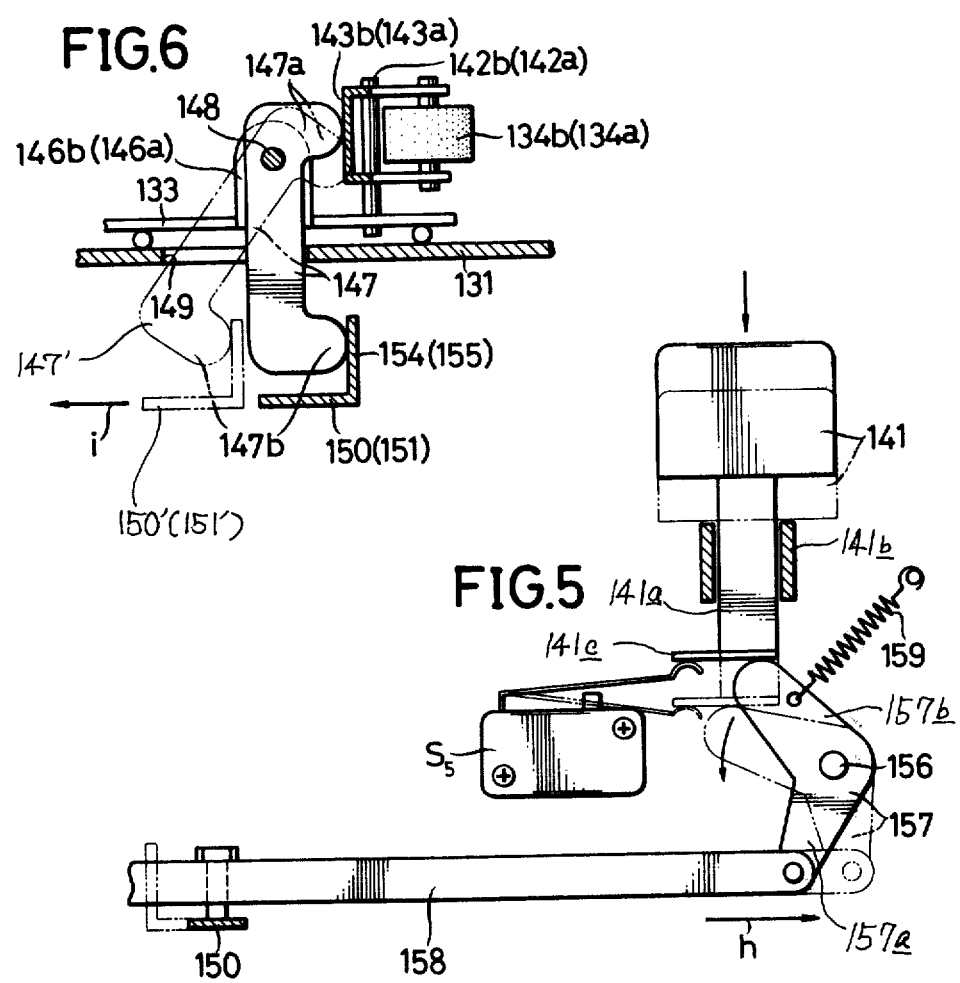

MODE SELECTING DEVICE HAVING A TIME DELAY BETWEEN SELECTION AND ESTABLISHMENT OF AN OPERATING MODE FOR TAPE RECORDING AND/OR RECORDING APPARATUS

BACKGROUND OF THE INVENTION

1. Field of the Invention

This invention relates generally to tape recording and/or reproducing apparatus, and more particularly is directed to improvements in operating mode selecting devices of the so-called "feather-touch" type for such apparatus.

2. Description of the Prior Art

Mode selecting devices of the "feather-touch" type have been provided for audio or video tape recording and/or reproducing apparatus in which the operator selectively actuates any desired one of a plurality of push-buttons corresponding to the various operating modes of the apparatus, for example, the modes for normal-forward transport of the tape as during recording and reproducing operations, for fast-forwarding of the tape and for rewinding of the tape, and such actuation of any selected push-button causes closing of a switch for energizing an electrically powered driver and also displaces a corresponding transmission member to an active position where it can be driven by the energized driver for establishing the selected operating mode of the apparatus. Further, in the existing mode selecting devices, each of the push-buttons for selecting an operating mode of the apparatus is locked in its active position upon its actuation to such active position from a rest position so as to maintain the selected operating mode of the apparatus until the locking action is released in response to either the actuation of a stop push-button or the actuation of another one of the operating mode selecting push-buttons, whereupon the previously actuated push-button is free to be spring-urged to its rest position for halting the operation of the apparatus in the respective operating mode.

Mode selecting devices of the above described type are advantageous in that only a relatively high force need be applied by the operator to a selected push-button for actuating the latter as such manually applied force is only required to close the switch and to displace the corresponding transmission member to its active position, while the major force for establishing the selected operating mode is applied by the electrically powered driver through the active transmission member. However, the foregoing advantage can lead to problems. Since only a light force has to be applied to any of the operating mode selecting push-buttons, it is possible that two or more of such push-buttons may be actuated in fairly rapid succession or almost simultaneously, for example, as when the operator first actuates a push-button that does not correspond to the desired operating mode and then immediately actuates the correct push button. In that case, the first actuated push-button may not have an opportunity to return to its rest position for withdrawing the corresponding transmission member from the active position thereof prior to the displacement to its active position of the transmission member corresponding to the second actuated push-button, with the result that two of the transmission members corresponding to different operating modes of the apparatus may be simultaneously driven by the electrically powered driver, and malfunctions of the apparatus and possible damage to the latter are apt to occur.

Further, in conventional audio recording and/or reproducing apparatus for use with tape cassettes, the magnetic recording and/or reproducing head or heads are mounted on a movable carriage which is normally in an inoperative position to permit the installation of a cassette in a predetermined position on the apparatus, and, in the normal-forward operating mode of the apparatus, the head carriage is moved to an operative position in which each head thereon is intended to project through a window or opening of the cassette housing for engaging the tape in the latter. When such conventional cassette type recording and/or reproducing apparatus is provided with the above described existing mode selecting device and the push-button for selecting the normal forward operating mode is actuated and locked in its active position prior to the installation of a cassette on the apparatus, the head or heads on the carriage in the operative position of the latter will interfere with the subsequent installation of the cassette and damage to the head or heads and/or to the cassette may result.

Modern cassette-type tape recording and reproducing apparatus provided with a mode selecting device as described above is also usually provided with a so-called "pause" control device by which the transport or movement of the tape in the normal-forward operating mode during recording or reproducing can be temporarily halted while the head carriage remains in its operative position for continued contact of the head or heads with the tape. When the pause control device is made operative by actuation of a respective pause control button, the pinch roller associated with each capstan, and usually mounted on the head carriage, is moved away from the capstan against the force of a spring for releasing the tape between the capstan and pinch roller, and the driving of the take-up reel of the cassette is halted even though the apparatus remains in its normal-forward operating mode. Further, the pause control button is usually of the so-called "push-push" type, that is, the first push or actuation thereof moves the pause control button to its active position where it is automatically locked for continued operation of the pause control device independently of the operating mode selecting push-buttons, until a subsequent push or actuation of the pause control button releases the latter to return to its rest or inactive position corresponding to the inoperative condition of the pause control device.

With the foregoing arrangement embodying a pause control device, the latter remains in its operative condition if, after actuation of the pause control button for obtaining that condition, the stop push-button is actuated to release the locking action on the push-button corresponding to the normal-forward operating mode for restoring the apparatus to its neutral mode. If, while the pause control device remains in its operative condition, the push-button corresponding to the normal-forward operating mode is again actuated, a relatively heavy load or resistance opposes the force of the electrically powered driver for re-establishing the normal-forward operating mode and damage to the apparatus may result therefrom.

SUMMARY OF THE INVENTION

Accordingly, it is an object of this invention to provide an improved mode selecting device for a tape recording and/or reproducing apparatus, which mode selecting device is of the so-called "feather-touch" type but avoids the above described disadvantages and problems in existing devices of that type.

More specifically, it is an object of this invention to provide a mode selecting device of the described type for a tape recording and/or reproducing apparatus and with which the rapid successive actuation of two or more of the operating mode selecting push-buttons will cause energizing of the electrically powered driver only after actuation of the last-actuated push-button for reliably establishing the operating mode to which that last-actuated push-button corresponds.

Another object is to provide a mode selecting device, as aforesaid, for a cassette-type tape recording and/or reproducing apparatus, and in which the normal-forward operating mode of the apparatus can be established only after a cassette has been installed in its operative position on the apparatus even though the push-button corresponding to that operating mode has been actuated prior to such installation of the cassette.

A further object is to provide a mode selecting device for a tape recording and/or reproducing apparatus with a pause control device, and in which the normal forward operating mode of the apparatus can be established by actuation of the corresponding push-button of the mode selecting device only if the pause control device is then in its inoperative condition.

In accordance with an aspect of this invention, a tape recording and/or reproducing apparatus having tape transport means for moving or transporting a tape during various operating modes of the apparatus is provided with a mode selecting device comprising a plurality of push-button members which are selectively actuable from normal rest positions to active positions for selecting corresponding operating modes of the apparatus, a plurality of transmission members respectively corresponding to the push-button members and each being disposable, in response to the actuation of the corresponding push-button member to its active position, to be driven by an electrically energizable driving means when the latter is energized for establishing the corresponding operating mode of the apparatus, locking means operative to retain any one of the push-button members in its active position and being released in response to the actuation of any one of the push-button members from its rest position, and means operative in response to actuation of any one of the push-button members from its rest position to its active position thereof for energizing the driving means with a predetermined time delay from the release of the locking means to the energizing of the driving means so that, in the event that two of said push-button members are actuated in succession within such predetermined time delay, the driving means is energized only to drive the one of the transmission members corresponding to the last actuated push-button member.

In a preferred embodiment of the invention, there are provided electrically controllable first switch means having ON and OFF states and being connected with the driving means for energizing the latter when said first switch means is in said ON state, circuit means for controlling the first switch means including second switch means having a normal OFF state and being changed-over to an ON state in response to any one of said push-button members being in its active position and delaying means having an initial condition corresponding to said OFF state of the first switch means and being changed to an altered condition a predetermined time after the second switch means has been changed-over to its ON state for establishing the ON state of the first switch means, and third switch means having a normal OFF state and being temporarily changed-over to an ON state, for example, by release of the locking means, for restoring said delaying means to said initial condition in response to actuation of any one of the push-button members.

In accordance with another feature of the invention, a tape recording and/or reproducing apparatus with a mode selecting device, as aforesaid, is provided with detecting means for detecting the absence of a tape cassette from the apparatus and, in response thereto, retaining said third switching means in its ON state for maintaining the delaying means in its initial condition so long as said detecting means detects the absence of a tape cassette whereby to prevent the establishment of an operating mode of the apparatus when a tape cassette is not positioned thereon.

In accordance with still another feature of the invention, a tape recording and/or reproducing apparatus with a mode selecting device, as aforesaid, is provided with fourth and fifth switch means connected in parallel with each other between said second switch means and said delaying means and each having ON and OFF states, means for changing-over the fourth switch means from its normal OFF state to its ON state when the apparatus is in its normal forward operating mode, as for recording or reproducing operations, a pause device which is made operative by actuation of a respective push-button for causing a pause in the normal forward movement of the tape while the apparatus remains in its normal forward operating mode, and means for changing-over said fifth switch means from its normal ON state to its OFF state in response to said pause device being in its operative condition so that any operating mode of the apparatus, and particularly the normal forward operating mode thereof, can be established by actuation of the respective push-button member only if the pause device is then in its inoperative condition.

The above, and other objects, features and advantages of this invention, will be apparent in the following detailed description of illustrative embodiments thereof which is to be read in connection with the accompanying drawings.

BRIEF DESCRIPTION OF THE DRAWINGS

FIG. 5 is an enlarged, side elevational view of a portion of the pause control device associated with the tape recording and/or reproducing apparatus of FIG. 4;

FIG. 6 is an enlarged sectional view taken along the line VI—VI on FIG. 4; and

DESCRIPTION OF THE PREFERRED EMBODIMENTS

Figure 1A:
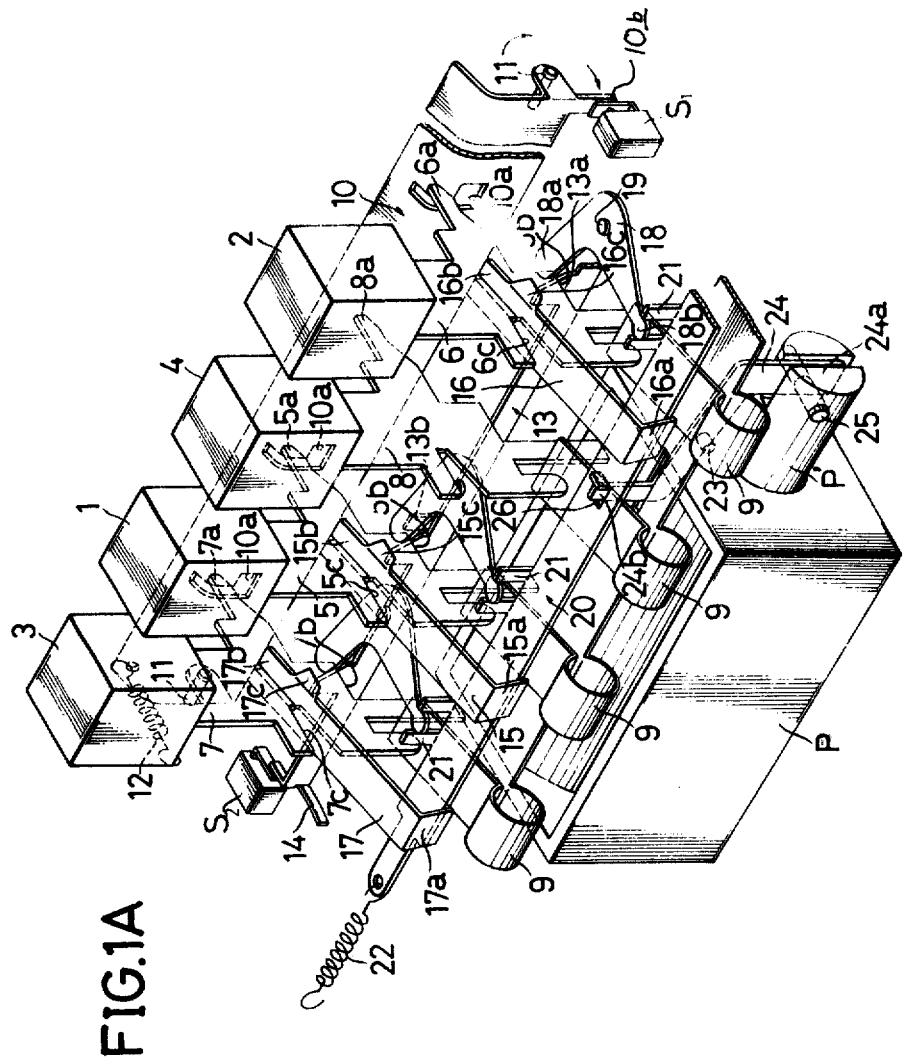
FIG. 1A is a schematic perspective view of the push-button assembly of a mode selecting device provided for a tape recording and/or reproducing apparatus according to an embodiment of this invention, with all of the elements of such push-button assembly being shown in their rest positions.
Figure 1B:
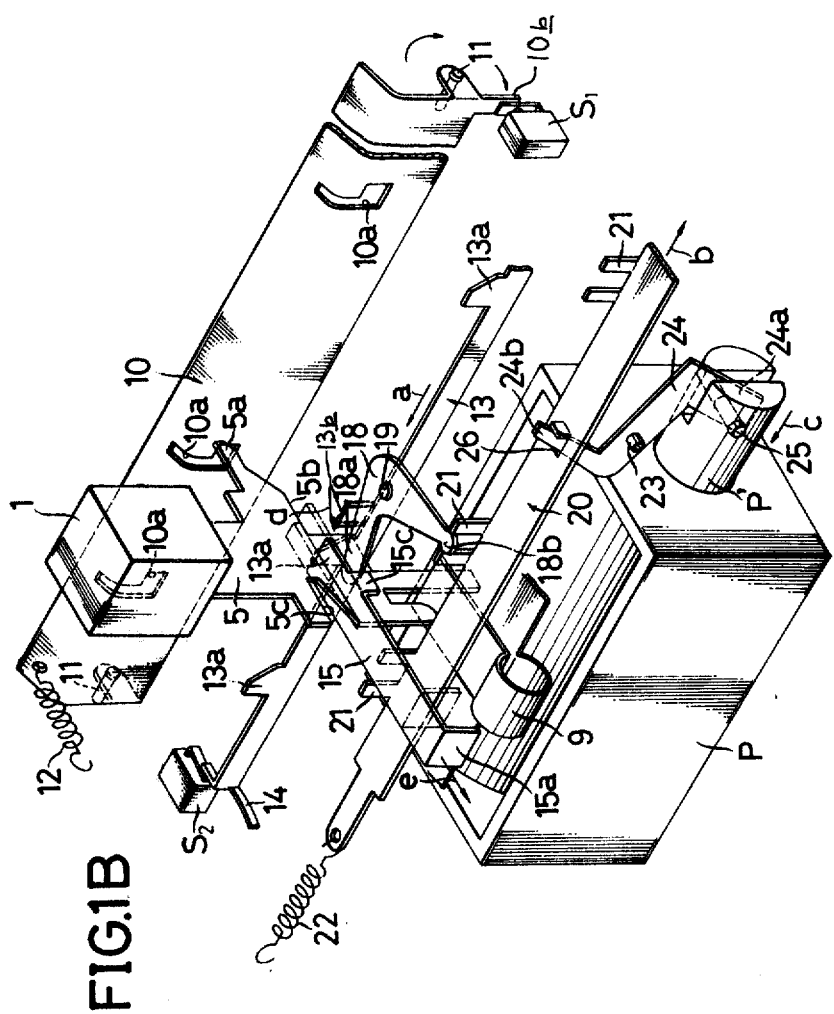
FIG. 1B is a view similar to that of FIG. 1A, but showing only a portion of the push-button assembly with the illustrated elements thereof being shown in their active or operative positions.

Referring to the drawings in detail, and initially to FIGS. 1A and 1B thereof, it will be seen that a mode selecting device according to this invention for a tape recording and/or reproducing apparatus includes a push-button delay assembly which, as shown, includes three push-buttons 1, 2 and 3 for selecting various operating modes of the apparatus, for exmple, the normal-forward operating mode for either reproducing or recording operations, the rewind operating mode and the fast-forward operating mode, respectively. The illustrated push-button assembly is further shown to include a stop push-button 4 arranged in a row with push-buttons 1, 2 and 3 and being actuable for returning the associated tape recording and/or reproducing apparatus from any one of the previously mentioned operating modes to a stop or neutral mode. The mode selecting device according to this invention may be provided with additional push-buttons for controlling other functions of the associated tape recording and/or reproducing apparatus, for example, with a recording push-button (not shown) which, when actuated simultaneously with the normal-forward push-button 1, selects the recording operating mode while actuation of push-button 1 alone selects the reproducing operating mode, and an ejecting push-button (not shown) actuable to eject a tape cassette from an operative position on the apparatus.

The illustrated push-buttons 1, 2, 3 and 4 are respectively mounted on the upper ends, as viewed on FIG. 1A, of associated push-button members or slides 5, 6, 7 and 8 which are suitably mounted on a push-button chassis (not shown) for substantially vertical movement between elevated rest positions (FIG. 1A) and depressed active or operative positions, for example, as shown in respect to push-button member or slide 5 on FIG. 1B. The push-button members or slides 5–8 are yieldably urged to their rest or elevated positions, for example, by respective leaf springs 9 which are suitably carried by the push-button chassis and act upwardly against lower ends of the respective push-button members 5–8.

In the push-button assembly of a mode selecting device according to this invention, any selected one of the operating mode selecting push-buttons 1, 2 and 3 which is depressed to its active position is retained or locked in that active position, so as to retain the tape recording and/or reproducing apparatus in the corresponding operating mode, until either the stop push-button 4 is actuated to return the apparatus to its stop or neutral condition or until another of the operating mode selecting push-buttons 1, 2 and 3 is actuated to change over the apparatus to another operating mode. For example, in the illustrated embodiment, a locking plate 10 extends laterally along the row of push-buttons 1–4 at the level of the respective members or slides 5–8 and is pivotally mounted, as at 11, on the push-button chassis for pivoting about a horizontal axis. The upper edge portion of locking plate 10 is inclined away from push-button members or slides 5–8, and is slidably engageable by fingers 5a, 6a, 7a and 8a respectively projecting from members or slides 5, 6, 7 and 8. A spring 12 is connected between locking plate 10 and a suitable anchor on the push-button chassis for urging locking plate 10 in the counterclockwise direction as viewed on FIGS. 1A and 1B. Further, locking plate 10 has locking openings or keepers 10a formed therein at locations along locking plate 10 corresponding to push-button members 5, 6 and 7 and disposed at a level to receive the respective fingers 5a, 6a and 7a when push-buttons 1, 2 and 3 are at their depressed or active positions.

When any one of the operating mode selecting push-buttons 1, 2 and 3 is actuated or depressed, the associated finger 5a, 6a or 7a rides downwardly against the inclined upper edge portion of locking plate 10 so as to angularly displace the latter in the clockwise direction, as viewed on FIGS. 1A and 1B, against the force of spring 12 until such finger enters the respective locking opening or keeper 10a, whereupon, spring 12 returns locking plate 10 in the counterclockwise direction to lock the actuated push-button 1, 2 or 3 and the respective member or slide 5, 6 or 7 in its active position. If a first one of the push-buttons 1, 2 or 3 is already locked in its depressed or active position at the time when a second one of the push-buttons 1, 2 or 3 is actuated or depressed, the initial angular displacement of locking plate 10 caused by the actuation of the second push-button serves to release the finger 5a, 6a or 7a of the first or previously actuated push-button member from the respective locking opening or keeper 10a so as to permit the return of the first push-button to its rest position by the associated spring 9. Thus, the actuation of any one of the push-buttons 1, 2 and 3 to its depressed or active position serves to lock that push-button in its active position and also to release any one of the push-buttons 1, 2 and 3 that has been previously locked in its active position. Since locking plate 10 does not have a locking opening or keeper 10a at the location of the finger 8a on member or slide 8 associated with stop push-button 4, actuation or depression of stop push-button 4 is merely effective to release any one of the push-buttons 1, 2 and 3 that was previously locked in its active position, and spring 9 associated with push-button member or slide 8 is effective to return stop push-button 4 to its elevated or rest position as soon as the downward pressure applied by the operator to push-button 4 is removed from the latter.

In order to prevent the actuation of push-button 1 for selecting the normal-forward operating mode at any time when the apparatus is in either its rewind operating mode or its fast-forward operating mode, that is, when either push-button 2 or push-button 3 is locked in its active position, the illustrated push-button assembly includes an elongated slider 13 extending laterally below downwardly facing shoulders 5b, 6b and 7b provided on the lower end portions of members 5, 6 and 7, respectively. Slider 13 is suitably mounted on the pushbutton chassis for longitudinal sliding relative to the latter and is yieldably urged toward the right, as viewed in FIGS. 1A and 1B, as by a leaf spring 14 acting against one end of slider 13. Projections 13a having edges that are inclined downwardly toward the right extend upwardly from slider 13 at spaced apart locations along the latter generally corresponding to the locations of push-button members 5, 6 and 7. Thus, when any one of the members 5, 6 and 7 is depressed to its active position, the shoulder 5b, 6b or 7b thereof acts downwardly on the inclined edge of the respective projection 13a to displace slider 13 toward the left, that is, in the direction indicated by the arrow a on FIG. 1B, against the force of spring 14. The projections 13a associated with the push-button members 6 and 7 have inclined edges that extend laterally a greater distance than the inclined edge of the projection 13a associated with the push-button member 5. Therefore, the displacement of slider 13 in the direction of the arrow a in response to actuation of push-button 2 or push-button 3 to its active position for selecting either the rewind operating mode or the fast-forward operating mode is greater than the displacement of the slider 13 resulting from the actuation of push-button 1 to its active position for selecting the normal-forward operating mode. Further, slider 13 has an abutment 13b projecting upwardly therefrom adjacent the projection 13a associated with push-button member 5. Such abutment 13b is located so that, when slider 13 is displaced in the direction of the arrow a on FIG. 1B as a result of the displacement of push-button 2 or 3 to its active position for selecting the rewind mode of operation or the fast-forward mode of operation, abutment 13b is positioned under shoulder 5b on member 5 for blocking the downward movement of the latter and of push-button 1 from its rest position. Thus, the normal-forward operating mode of the apparatus cannot be selected while the apparatus is either in its rewind operating mode or in its fast-forward operating mode.

Operating or transmission members 15, 16 and 17 are associated with the push-button members 5, 6 and 7, respectively, and are suitably mounted on the push-button chassis for individual longitudinal movement relative to such chassis and for pivoting in respect to the latter about ends 15a, 16a and 17a of the transmission members. The other end portions of the transmission members 15, 16 and 17 are forked, as at 15b, 16b and 17b, and such forked end portions of the transmission members are in slidable, interlocking engagement with elongated cutouts 5c, 6c and 7c formed in push-button members 5, 6 and 7, respectively. By reason of such slidable, interlocking engagement, transmission members 15, 16 and 17 are inclined downwardly toward their ends 15a, 16a and 17a when the respective push-buttons 1, 2 and 3 are in their elevated rest positions, and the actuation of any one of the push-buttons 1, 2 and 3 to its depressed active position is effective to displace the respective transmission member 15, 16 or 17 to a substantially horizontal active position, as shown in respect to the transmission member 15 on FIG. 1B. In such horizontal active position, the transmission member is effective to be driven in the direction of the arrow e on FIG. 1B, as hereinafter described in detail. The ends 15a, 16a and 17a of transmission members 15, 16 and 17 are respectively connected with, or act upon, suitable conventional mechanisms of a tape recording and/or reproducing apparatus by which the normal-forward, rewind and fast-forward operating modes of the apparatus are respectively established.

For example, if the mode selecting device according to this invention is associated with a tape recording and/or reproducing apparatus of the type in which the tape is wound on supply and take-up reels and a magnetic recording or reproducing head is engageable with a run of the tape between such reels only during recording or reproducing operations, then the driving of transmission member 15 in the direction of the arrow e on FIG. 1B causes the associated mechanism (not shown) to displace the magnetic head to an operative position against the tape, to engage a pinch roller against a rotated capstan with the tape therebetween for moving or transporting the tape in the direction toward the takeup reel at the normal-forward speed for recording or reproducing, and to drive the take-up reel at a relatively slow speed for winding the tape thereon. On the other hand, when the transmission member 16 is driven parallel to the direction of the arrow e on FIG. 1B, the associated mechanism (not shown) is effective to cause the relatively high speed rotation of the supply reel in the direction of rewinding the tape thereon while the magnetic head remains in its inoperative position spaced from the tape and the pinch roller is spaced from the capstan. Similarly, when transmission member 17 is driven in the direction parallel to the arrow e on FIG. 1B, the associated mechanism (not shown) is effective to cause the relatively high speed rotation of the takeup reel in the direction for winding the tape thereon, while the magnetic head and the pinch roller are again maintained in their inoperative positions.

In the mode selecting device according to this invention, the force for selectively driving the transmission members 15, 16 and 17 is provided by electrically energizable driving means, for example, by a solenoid P having an armature P' which extends from the solenoid in the de-energized condition of the latter (FIG. 1A), and which is retracted (FIG. 1B) when the solenoid is energized. The solenoid P, as shown, is located under transmission members 15, 16 and 17 with the axis of its armature P' extending laterally in respect to the directions of longitudinal movement of the transmission members. The armature P' is pivotally connected, as at 25, to one end portion 24a of a generally Z-shaped lever 24 which is pivoted, intermediate its ends, on a pin 23 carried by the push-button chassis for movement in a plane that is vertical, as shown. The opposite end portion 24b of lever 24 extends into an opening 26 formed in an actuating rod 20 which extends laterally under transmission members 15, 16 and 17 and which is suitably mounted for longitudinal sliding movement in respect to the push-button chassis. A spring 22 is connected between one end of actuating rod 20 and a suitable anchor on the push-button chassis for urging actuating rod 20 toward the left, as viewed, while the energizing of solenoid P and the retraction of its armature P' in the direction of the arrow c on FIG. 1B is effective to displace actuating rod 20 toward the right, that is, in the direction indicated by the arrow b. Forked projections 21 project upwardly from actuating rod 20 at locations spaced apart along the latter and receive end portions 18b of bellcranks 18 which are associated with transmission members 15, 16 and 17, respectively. The bellcranks 18 are mounted, intermediate their ends, on supporting pins 19 carried by the push-button chassis for swinging of bellcranks 18 in horizontal planes, and the other ends 18a of bellcranks 18 extend under the forked end portions 15b, 16b and 17b of the transmission members. Such forked end portions of transmission members 15, 16 and 17 have depending abutments 15c, 16c and 17c which are engageable by the end portions 18a of the respective bellcranks 18 only when the transmission members 15, 16 and 17 are depressed to their substantially horizontal active positions in response to the actuation of the related push-buttons, 1, 2 and 3 to the active positions of the latter. It will be apparent that, when push-buttons 1, 2 and 3 are in their elevated rest positions, the abutments 15c, 16c and 17c on the inclined transmission members 15, 16 and 17, respectively, are raised above the horizontal plane of movement of the end portions 18a of the respective bellcranks 18. Thus, when any one of the push-buttons 1, 2 and 3 is depressed to its active position, the displacement of the respective transmission member 15, 16 or 17 to its horizontal active position is effective to dispose the abutment 15c, 16c or 17c in the path of movement of the end portion 18a of the respective bellcrank 18, whereupon, the energizing of solenoid P for driving actuating rod 20 in the direction of the arrow b on FIG. 1B and thereby turning the bellcranks 18 in the direction of the arrow d causes the transmission member which is in its active horizontal position, for example, the transmission member 15 (FIG. 1B), to be driven by the associated bellcrank 18 in the direction of the arrow e for establishing the respective operating mode of the tape recording and/or reproducing apparatus.

In accordance with the present invention, the actuation of any one of the push-buttons 1, 2 and 3 from its rest position to its active position causes energizing of the driving solenoid P only after a predetermined time delay so that, in the event that two of the push-buttons 1, 2 and 3 are actuated in rapid succession, the driving solenoid P is energized only after actuation of the last push-button to drive the transmission member 15, 16 or 17 which corresponds to the last actuated push-button.

Figure 2:
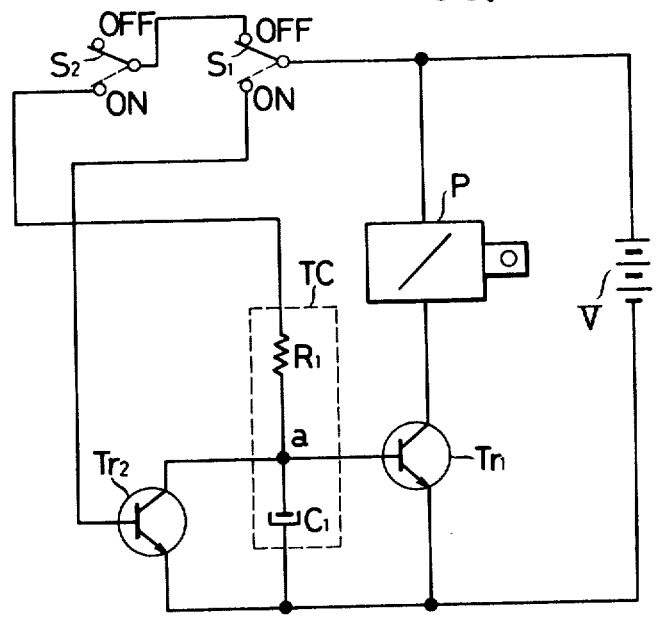
FIG. 2 is a circuit diagram of a mode selecting device according to this invention which includes the push-button assembly shown on FIGS. 1A and 1B.

More particularly, as shown on FIG. 2, the energizing of driving solenoid P is controlled by a first switch means $T_{r1}$ having ON and OFF states and being shown in the form of a transistor having its collector-emitter path connected in series with the coil of solenoid P between the positive and negative terminals of an electrical supply source V. The transistor $T_{r1}$ constituting the first switch means is electrically controllable by the potential applied to its base so as to be conductive or in its ON state for energizing solenoid P only when at least a predetermined potentenial is applied to its base, and to be non-conductive or in its OFF state for de-energizing the driving solenoid whenever the base potential falls below the predetermined level. A circuit for electrically controlling transistor $T_{r1}$ is shown to include second switch means $S_2$ having a normal OFF state and being changed over to, and retained in an ON state in response to actuation of any one of push-buttons 1, 2 and 3 to its active positions, and delaying means, shown in the form of a time constant circuit TC, having an initial condition corresponding to the OFF state of the first switch means or transistor $T_{r1}$ and being changed to an altered condition a predetermined time after the second switch means $S_2$ has been changed over to its ON state for establishing the ON state of transistor $T_{r1}$.

More specifically, the second switch means $S_2$ is shown to be constituted by a microswitch which is normally in its OFF state and which is mounted adjacent one end of slider 13 (FIGS. 1A and 1B) so as to be changed over to its ON state when slider 13 is displaced in the direction of the arrow a in response to actuation of any one of push-buttons 1, 2 and 3 to its active position. Of course, switch $S_2$ remains in its ON state so long as any one of push-buttons 1, 2 and 3 is locked or retained in its active position by locking plate 10. As shown particularly on FIG. 2, a movable contact of switch $S_2$ is connected to the positive terminal of electrical supply source V, and switch $S_2$ has two fixed contacts which are alternately engaged by the movable contact in the OFF and ON states, respectively, of such switch. The fixed contact engaged in the OFF state is an open contact, while the fixed contact engaged in the ON state is connected to the negative terminal of electrical supply source V through time constant circuit TC which consists of a resistor $R_1$ and a capacitor $C_1$ in series. A connection point a between resistor $R_1$ and capacitor $C_1$ is connected to the base of transistor $T_{r1}$.

In the initial condition of time constant circuit TC, capacitor $C_1$ is substantially discharged so that a low potential is applied from connection point a to the base of transistor $T_{r1}$ and the latter is then in its non-conductive or OFF state. Upon change over of switch $S_2$ to its ON state, capacitor $C_1$ is charged at a predetermined rate and, after a predetermined time, the altered condition of time constant circuit TC is attained, which altered condition corresponds to a predetermined electrical charge on capacitor $C_1$ so that the potential applied from connection point a to the base of transistor $T_{r1}$ is effective to turn ON such transistor.

Further, in accordance with this invention, a third switch means is provided having a normal OFF state and being temporarily or momentarily changed over to an ON state in response to actuation of any one of the push-buttons 1, 2 and 3 for restoring the delaying means or time constant circuit TC to its initial condition. More specifically, as shown, such third switch means includes a transistor $T_{r2}$ and a switch $S_1$. The transistor $T_{r2}$ has its collector-emitter path connected in parallel with the capacitor $C_1$, that is, between connection point a and the negative terminal of electrical supply source V, for substantially removing any charge from capacitor $C_1$ when transistor $T_{r2}$ is rendered conductive. The switch $S_1$ is mechanically actuated and has a normal or OFF position in which power is supplied through switch $S_1$ to switch $S_2$, and a changed-over or ON position to which switch $S_1$ is temporarily displaced in response to the actuation of any one of the push-buttons 1, 2 and 3, and in which potential is applied to the base of the transistor $T_{r2}$ for rendering the latter conductive.

More specifically, as shown on FIGS. 1A and 1B, switch $S_1$ may be constituted by a microswitch disposed adjacent an actuating member 10b depending from locking plate 10 so that, when locking plate 10 is turned in the clockwise direction in response to the downward movement of any one of push-buttons 1, 2 and 3 from its elevated rest position, actuating member 10b is effective to change-over microswitch $S_1$ from its normal OFF state or position to its ON state or position. Further, as shown on FIG. 2, switch $S_1$ has a movable contact connected to the positive terminal of electrical supply source V, and a first or OFF fixed contact connected to the movable contact of switch $S_2$ and being engaged by the movable contact of switch $S_1$ in the OFF state of the latter and a second or ON fixed contact engaged by the movable contact of switch $S_1$ in the ON state of the latter and being connected to the base of transistor $T_{r2}$.

The mode selecting device according to the embodiment of this invention described above with reference to FIGS. 1A, 1B and 2 operates as follows:

When any one of the push-buttons 1, 2 and 3 is depressed from its elevated rest position to its active position for selecting the normal-forward, rewind of fast-forward operating mode of the associated tape recording and/or reproducing apparatus, locking plate 10 is momentarily turned in the direction of the arrows on FIGS. 1A and 1B for temporarily changing-over switch $S_1$ to its ON state, and then is returned by spring 12 for locking the depressed push-button in its active position. The downward movement of the selected push-button 1, 2 or 3 to its active position causes similar downward movement of the respective member 5, 6 or 7, with the result that the shoulder 5b, 6b or 7b of the latter acts on the inclined edge of the respective projection 13a on slider 13 for displacing the latter in the direction of the arrow a on FIG. 1B and thereby causing change-over of switch $S_2$ from its OFF state to its ON state. The change over of switch $S_2$ to its ON state and the return of switch $S_1$ to its normal or OFF state causes current to be supplied through switches $S_1$ and $S_2$ to time constant circuit TC so as to commence the charging of capacitor $C_1$. The downward movement of one of the members 5, 6 or 7 in response to the displacement of the respective push-buttons 1, 2 or 3 to its active position further causes pivoting of the associated transmission member 15, 16 or 17 to its horizontal active position in which the abutment 15c, 16c or 17c on such transmission member is disposed in the path of travel of the end portion of arm 18a of the respective bellcrank 18. After a predetermined time delay, the charging of capacitor $C_1$ has progressed sufficiently so that the electrical charge thereon, and hence the potential at connection point a which is applied to the base of transistor $T_{r1}$, is sufficient to turn ON the latter so that solenoid P is energized. The energized solenoid retracts its armature P' in the direction of the arrow c on FIG. 1B. Retraction of the armature P' turns lever 24 so that rod 20 is displaced in the direction of the arrow b for turning all of the bellcranks 18 in the direction of the arrow d. Such turning of bellcranks 18 causes the arm or end portion 18a of the bellcrank associated with the transmission member 15, 16 or 17, which is in its horizontal active position to act forcibly against the depending abutment 15c, 16c or 17c of such transmission member for driving the latter in the direction of the arrow e, for example, from the position shown in broken lines to the position shown in full lines on FIG. 1B, and thereby establishing the respective operating mode of the tape recording and/or reproducing apparatus.

It will be apparent that, in the mode selecting device according to this invention, only a relatively small force has to be applied by the operator for depressing a selected one of the push-buttons 1, 2 and 3 to its active position. Such relatively small manually applied force need only be sufficient to overcome the resistance of the respective spring 9 and to displace the respective transmission member 15, 16 or 17 to its substantially horizontal active position, whereas the substantial force required for establishing the respective operating mode of the tape recording and/or reproducing apparatus is furnished by the solinoid P. Thus, the described mode selecting device is of the "feather-touch" type.

When the stop push-button 4 is depressed to halt the operation of the tape recording and/or reproducing apparatus in a previously selected operating mode, locking plate 10 is pivoted to release the previously depressed push-button 1, 2 or 3 and permit the return of the latter to its elevated rest position by the associated spring 9. The pivoting of locking plate 10 for releasing its locking action in response to the depressing of stop push-button 4 causes change-over of switch $S_1$ to its ON state so that transistor $T_{r2}$ is rendered conductive with the result that the electrical charge on capacitor $C_1$ is removed therefrom through transistor $T_{r2}$ and transistor $T_{r1}$ is turned OFF for de-energizing solenoid P. With the return of the previously depressed push-button 1, 2 or 3 to its elevated rest position, the slider 13 is displaced by spring 14 toward the right, as viewed in FIGS. 1A and 1B so that switch $S_2$ returns to its normal OFF state to halt the supply of current to time constant circuit TC. Further, the return of the previously depressed push-button 1, 2 or 3 to its elevated rest position restores the associated transmission member 15, 16 or 17 to its upwardly inclined or inactive position with the result that the respective abutment 15c, 16c or 17c is freed from the corresponding bellcrank 18 and the transmission member 15, 16 or 17 can be longitudinally displaced in the direction opposed to the arrow e by a restoring force applied to its end 15a, 16a or 17a by the associated mode-establishing mechanism of the tape recording and/or reproducing apparatus.

By reason of the relatively light force required to move push-buttons 1, 2 and 3 to their active positions, the described mode selecting device of the "feather-touch" type is susceptible to so-called "quick motion", that is, to the rapid successive actuation of two or more of the operating mode selecting push-buttons. However, even when the mode selecting device according to this invention is subjected to such "quick motion," the above described arrangement thereof ensures that only the operating mode corresponding to the last actuated push-button will be established. More specifically, and by way of example, if push-button 1 for establishing the normal-forward operating mode is initially depressed erroneously at a time when the fast-forward operating mode is desired, and the operator immediately recognizes the error and depresses the correct push-button 3 prior to the expiration of the time delay established by time constant circuit TC for energizing of solenoid P, the mode selecting device according to this invention will operate as follows:

Upon the erroneous actuation of push-button 1, switch $S_1$ is momentarily changed-over to its ON state while switch $S_2$ is still in its OFF state, so that transistor $T_{r2}$ is rendered conductive to remove any electrical charge from capacitor $C_1$ and thereby insure that transistor $T_{r1}$ is in its OFF state corresponding to the de-energized condition of solenoid P. As the erroneous displacement of push-button 1 to its active position continues, switch $S_2$ is changed-over to its ON state to commence the charging of capacitor $C_1$. However, when the correct push-button 3 is actuated to its active position within the predetermined time delay, that is, before the charge on capacitor $C_1$ reaches the level at which transistor $T_{r1}$ is turned ON for energizing solenoid P, switch $S_1$ is again momentarily changed-over to its ON state in the course of the actuation of push-button 3 to its active position so that transistor $T_{r2}$ is momentarily made conductive to again remove the electrical charge from capacitor $C_1$. Of course, the actuation of the correct push-button 3 towards its active position serves to release the locking plate 10 so that push-button 1 which was erroneously first diplaced to its active position is freed to be moved toward its elevated rest position by the associated spring 9. As the correct push-button 3 nears its active position, the switch $S_2$ is again changed-over to its ON state so that charging of capacitor $C_1$ commences again. Finally, when capacitor $C_1$ is charged to the predetermined level, transistor $T_{r1}$ is turned ON and solenoid P is energized with the result that transmission member 17 associated wtih correct push-button 3 is forcibly displaced for establishing the desired fast-forward operating mode. By reason of the discharging of capacitor $C_1$ in response to the initial actuation of the second push-button 3, the time delay provided before the energizing of solenoid P runs from the actuation of push-button 3 to its active position in order to insure that the transmission member 15 associated with push-button 1 that was first actuated erroneously will have had an opportunity to return to its inclined inactive position, and thus will not be driven in response to the energizing of solenoid P. From the foregoing, it will be apparent that, when two or more of the operating mode selecting push-buttons are actuated in rapid succession, only the operating mode corresponding to the last-actuated push-button will be established, whereby malfunction or damage to the mechanisms of the associated tape recording and/or reproducing apparatus are prevented.

Figure 3:
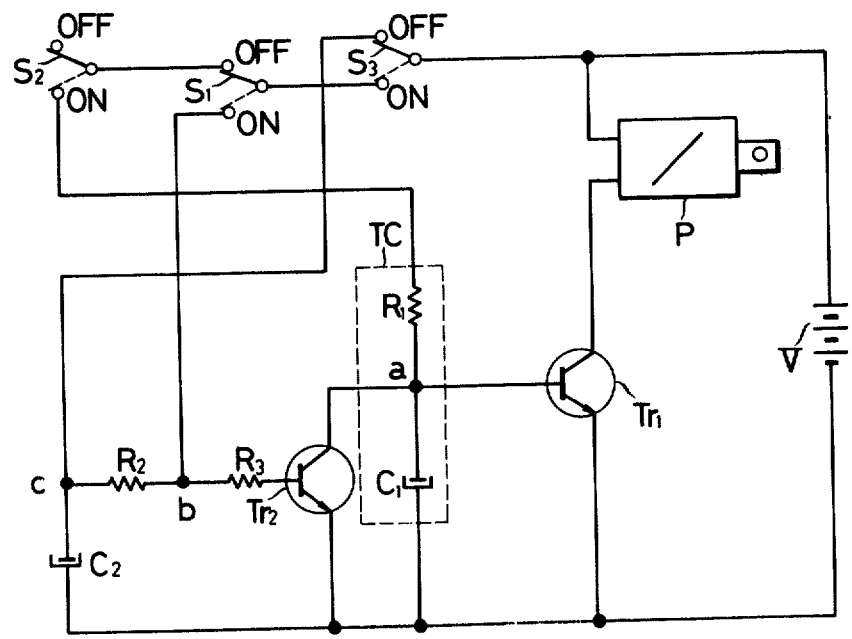
FIG. 3 is a circuit diagram similar to that of FIG. 2, but illustrating a mode selecting device according to another embodiment of this invention adapted for a cassette-type tape recording and/or reproducing apparatus, and which includes a detector for detecting the presence and absence of a cassette on such apparatus.

Referring now to FIG. 3 of the drawings, it will be seen that, in a modification of the mode selecting device according to this invention described above with reference to FIGS. 1A, 1B and 2, and which is intended for use with a cassette-type tape recording and/or reproducing apparatus, an arrangement is provided to delay the establishment of any operating mode of the apparatus until after a tape cassette has been disposed or installed in its operative position on the apparatus. More particularly, as shown on FIG. 3 in which the various components corresponding to those described above with reference to FIG. 2 are identified by the same reference letters, a cassette detecting means is provided in the form of a switch $S_3$ which is normally in the OFF state when a tape cassette is absent from the operative position on the apparatus, and which detects or indicates the presence of a tape cassette at such operative position by being changed over to its ON state. As shown, the switch $S_3$ has a movable contact connected to the positive terminal of electrical supply source V, a first fixed contact connected with the movable contact of switch $S_1$ and being engaged by the movable contact of switch $S_3$ only when the latter is in its ON state, and a second fixed contact which is engaged by the movable contact of switch $S_3$ in the OFF state of the latter and which is connected to the negative terminal of electrical supply source V through a capacitor $C_2$. Further, the connection between capacitor $C_2$ and switch $S_3$ is connected, at the point c, through resistors $R_2$ and $R_3$ to the base of transistor $T_{r2}$, and a connection point b between resistors $R_2$ and $R_3$ is connected to the fixed contact of switch $S_1$ which is engaged by the movable contact of the latter in the ON state of switch $S_1$.

The mode selecting device according to the embodiment of this invention illustrated on FIG. 3 operates as follows:

If a tape cassette is installed in the operative position on the associated tape recording and/or reproducing apparatus prior to the actuation of any of the operating mode selecting push-buttons 1, 2 and 3, switch $S_3$ detects the presence of the tape cassette and is thereby changed-over to its ON state. Thereafter, the mode selecting device operates in substantially the same manner as has been described above in connection with FIGS. 1A, 1B and 2.

However, if a selected one of push-buttons 1, 2 and 3 is actuated to its active position at a time when a tape cassette is not installed in the operative position on the apparatus, the absence of the tape cassette is detected or indicated by switch $S_3$ remaining in its OFF state. Therefore, even though the actuation of a selected one of push-buttons, 1, 2 or 3 to its active position causes change-over of switch $S_2$ to its ON state, the circuit for supplying current to time constant circuit TC is interrupted at switch $S_3$ and a potential for rendering transistor $T_{r2}$ conductive is applied to the base of the latter by way of switch $S_3$ in its OFF state and resistors $R_2$ and $R_3$. Any change on capacitor $C_1$ is removed from the latter through conductive transistor $T_{r2}$ with the result that transistor $T_{r1}$ remains in its OFF state and solenoid P is de-energized.

Thereafter, when a tape cassette is installed in the operative position on the apparatus with a selected one of push-buttons 1, 2 and 3 already locked in its operative position so as to dispose switch $S_2$ in its ON state, switch $S_3$ is changed-over to its ON state in response to the correct positioning of the tape cassette, and thus disconnects the connection point c from the electrical supply source V and connects the time constant circuit TC to the electrical supply source through switch $S_3$ in its ON state and switch $S_1$ in its OFF state and through switch $S_2$ in its ON state. Upon the disconnection of connection point c from the electrical supply source, the electrical charge on capacitor $C_2$ flows through resistors $R_2$ and $R_3$ to the base of transistor $T_{r2}$ so that the latter remains in its conductive state for a predetermined time established by the values of capacitor $C_2$ and resistors $R_2$ and $R_3$. So long as transistor $T_{r2}$ is thus maintained in its conductive state, the current supplied to time constant circuit TC flows through the conductive collector-emitter path of transistor $T_{r2}$ and does not charge capacitor $C_1$. When the discharging of capacitor $C_2$ is completed, the potential at the base of transistor $T_{r2}$ is sufficiently reduced to render that transistor non-conductive, with the result that the charging of capacitor $C_1$ commences. When the charge on capacitor $C_1$ reaches a predetermined level, the potential applied from connection point a to the base of transistor $T_{r1}$ turns ON the latter and solenoid P is then energized.

It will be apparent from the above description that, in the embodiment of FIG. 3, an additional time delay is provided by the capacitor $C_2$ and the resistors $R_2$ and $R_3$ prior to the energizing of solenoid P when a selected one of the push-buttons 1, 2 and 3 is actuated to its active position prior to the installation of a tape cassette at the operatove position on the apparatus. Of course, in cassette type tape recording and/or reproducing apparatus, the magnetic recording and/or reproducing head or heads are usually mounted on a movable carriage which is normally in an inoperative or inactive position to permit the installation of cassette in the correct position on the apparatus, and, in the normal-forward operating mode of the apparatus for recording and reproducing operations, the head carriage is moved to an operative position in which each head thereon is intended to project through a window or opening of the cassette housing for engaging the tape in the latter. If the head carriage is allowed to be moved to its operative position prior to the installation of a tape cassette in the apparatus, or if the head carriage moves toward its operative position during the installation of a tape cassette, there is the danger that the head or heads on the carriage will interfere with the installation of the cassette or will not properly enter the window or openings provided therefor in the tape cassette with resulting damage to the head or heads and/or to the cassette. However, by reason of the described additional time delay provided by capacitor $C_2$ and resistors $R_2$ and $R_3$ in respect to the energizing of solenoid P, the embodiment of this invention illustrated on FIG. 3 insures that, even if push-button 1 for selecting the normal-forward operating mode is actuated to its active position prior to the installation of a cassette in the apparatus, the establishment of a normal-forward operating mode, that is, the movement of the head carriage to its operative position, will be delayed so as to occur after the cassette is safely seated in its operative position for eliminating any possibility of damage to either the cassette or the magnetic head or heads.

If the tape cassette is installed in the apparatus prior to the actuation of any one of the push-buttons, 1, 2 and 3 so that switch $S_3$ is initially in its ON state, the displacement of a selected one of the push-buttons to its active position and the momentary resulting change-over of switch $S_1$ from its normal OFF state to its ON state does not cause substantial charging of capacitor $C_2$ through resistor $R_2$ so that, when switch $S_1$ immediately returns to its normal OFF state and switch $S_2$ is changed-over to its ON state, the charge on capacitor $C_2$ is insufficient to maintain transistor $T_{r2}$ in its conductive state for a substantial period, and charging of capacitor $C_1$ commences almost immediately to provide the relatively shorter time delay of time constant circuit TC in respect to the energizing of solenoid P. Thus, if a tape cassette is installed in the apparatus prior to the actuation of any of the push-buttons 1, 2 and 3, a relatively shorter time delay is provided for the energizing of solenoid P for the purposes previously described herein in connection with the embodiment of FIG. 2.

Figure 4:
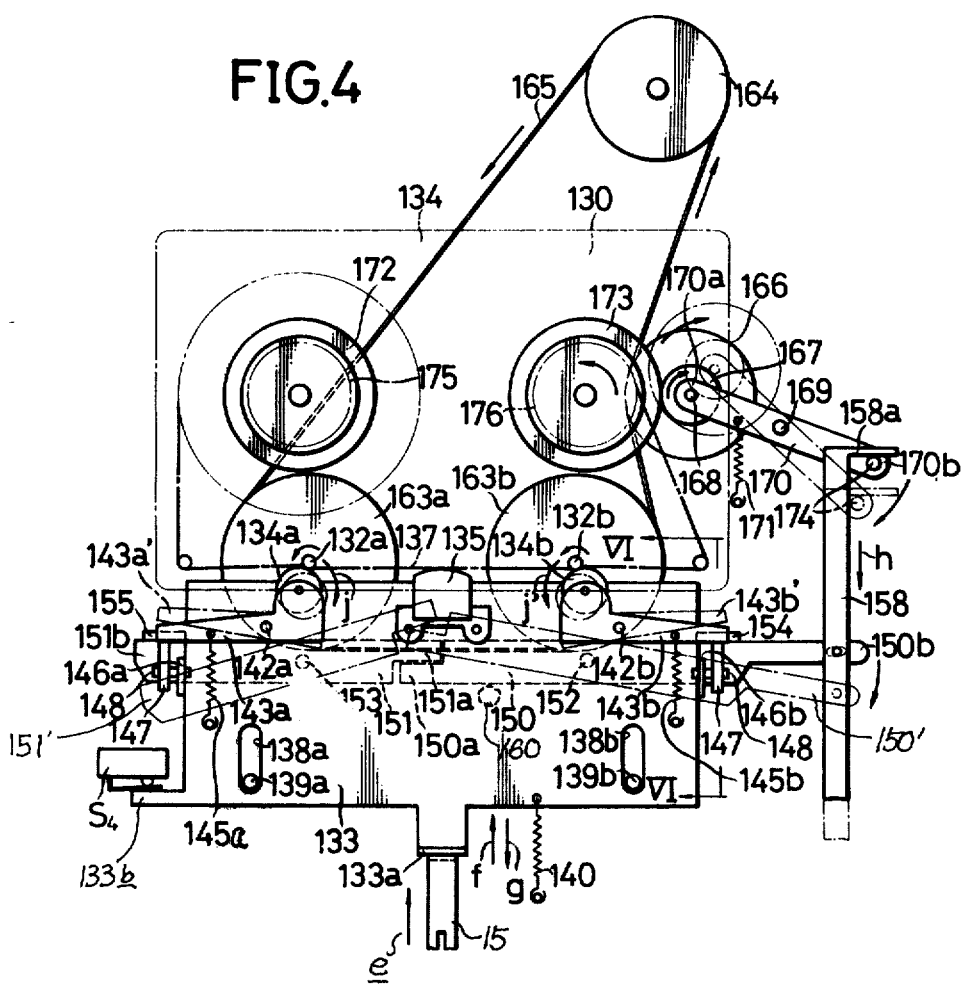
FIG. 4 is a schematic top plan view illustrating portions of a tape recording and/or reproducing apparatus which is to be provided with a mode selecting device according to another embodiment of this invention having a pause control for temporarily halting the movement or transport of the tape when the apparatus is in its normal-forward operating mode for recording or reproducing operations.

Referring now to FIG. 4, it will be seen that the tape recording and/or reproducing apparatus that is to be provided with a mode selecting device according to this invention and also with a pause control device is thus illustrated to be of the dualcapstan type in which two spaced apart capstans 132a and 132b are rotatably mounted on a chassis, for example indicated at 131 on FIG. 6, so that the capstans extend above the chassis and enter suitable openings in the housing of a tape cassette 130 indicated in broken lines on FIG. 4, when such cassette is installed in its operative position on the chassis. A head carriage 133 is mounted on the chassis, for example, by means of pins 139a and b extending from the chassis and being slidably received in elongated slots 138a and 138b in carriage 133, so as to permit movement of carriage 133 in the direction of the arrow f toward the operatively positioned cassette 130 and in the direction of the arrow g away from the operatively positioned cassette.

A recording and/or reproducing magnetic head 135 is mounted on carriage 133 so that, when the latter is moved in the direction of the arrow f to its operative position shown on FIG. 4, head 135 will extend through a suitable opening or window in the periphery of the housing of cassette 130 for engaging a run of a magnetic tape 137 which extends along the periphery of the cassette housing between capstans 132a and 132b. The carriage 133 may also carry the usual erasing magnetic head (not shown) which is operative to erase signals from the tape 137 in advance of head 135 during recording operation of the apparatus. Also mounted on carriage 133 are pinch rollers 134a and 134b which, in the operative position of carriage 133, are adapted to extend through respective windows or openings in the periphery of the cassette housing for pressing the tape 137 against capstans 132a and 132b, respectively.

Carriage 133 is adapted to be displaced in the direction of the arrow f to the illustrated operative position by means of transmission member 15 of the previously described mode selecting device according to this invention when such transmission member 15 is driven in the direction of the arrow e against an abutment 133a on carriage 133. A spring 140 is connected between carriage 133 and a suitable abutment on the chassis for returning carriage 133 in the direction of the arrow g to an inoperative position, for example, upon the return of the normal-forward operating mode selecting push-button 1 to its elevated rest position and the de-energizing of solenoid P. During such return of carriage 133 to its inoperative position, abutment 133a acts against transmission member 15 for moving the latter longitudinally in opposition to the arrow e, as previously described in connection with the operation of the mode selecting device according to this invention. In the inoperative position of carriage 133, pinch rollers 134a and 134b and magnetic head 135 are withdrawn from the cassette 130 so that the latter may be either installed in, or withdrawn from its operative position on the chassis. Further, carriage 133 is maintained in its inoperative position for the rewind and fast-forward modes of operation of the apparatus so that neither head 134 nor pinch rollers 134a and 134b engage tape 137 within cassette 130 to interfere with the fast-forwarding or rewinding of the tape.

The pinch rollers 134a and 134b are rotatably mounted at the inner end portions of laterally extending support levers 143a and 143b, respectively, which are pivotally mounted, intermediate their ends, on pivot pins 142a and 142b extending from carriage 133. Springs 145a and 145b extend between support levers 143a and 143b, respectively, and carriage 133 for yieldably urging the respective support levers to pivot in the directions moving pinch rollers 134a and 134b toward the respective capstans 132a and 132b. The outer end portions of support levers 143a and 143b project laterally beyond the opposite sides of carriages 133, and support lugs 146a and 146b project upwardly from the opposite sides of carriage 133 and are engageable by the outer end portions of support levers 143a and 143b for limiting the pivotal movements of the support levers by springs 145a and 145b. Thus, in the inoperative position of carriage 133 in which carriage 133 is substantially displaced in the direction of the arrow g from the operative position shown on FIG. 4, springs 145a and 145b cause support levers 143a and 143b to be angularly displaced substantialy in the counterclockwise directions, respectively, from the positions shown on FIG. 4, with pinch rollers 134a and 134b being nevertheless spaced from the respective capstans 132a and 132b.

In the course of the movement of carriage 133 to its operative position, that is, during establishment of the normal-forward operating mode for recording or reproducing operations, pinch rollers 134a and 134b come against capstans 132a and 132b, respectively, with the tape 137 therebetween, and then support levers 143a and 143b are pivoted in the clockwise and counterclockwise directions to the position shown on FIG. 4, with springs 145a and 145b resisting such pivoting of the support levers and thus providing the requisite pressure of the pinch rollers against the respective capstans in the normal-forward operating mode.

As shown in FIG. 4, the tape within the housing of cassette 130 is wound on supply and take-up reels 172 and 173, respectively, and is guided between such reels for movement in a path that extends along the peripheral wall of the cassette housing having the previously mentioned windows or openings therein which permit the entry of magnetic head 135 and pinch rollers 134a and 134b in the normal-forward operating mode. When tape cassette 130 is installed in its operative position on the tape recording and/or reproducing apparatus, reel drive hubs 175 and 176 mounted rotatably above the chassis extend into the cassette housing and respectively engage in supply and take-up reels 172 and 173 for rotatably supporting such reels.

The conventional tape drive mechanism of the illustrated apparatus is shown to include driven pulleys 163a and 163b which are rotatably fixed to capstans 132a and 132b, respectively, a drive pulley 164 connected with the shaft of an electric motor (not shown), and a belt 165 which extends around pulleys 163a, 163b and 164 for rotating capstans 132a and 132b in the counterclockwise direction, as viewed on FIG. 4, in response to operation of the elecrric motor. Thus, with carriage 133 in its operative position for normally pressing pinch rollers 134a and 134b against capstans 132a and 132b, respectively, with the tape 137 therebetween, the tape contacted by magnetic head 135 is driven at the normal-forward speed for recording or reproducing signals thereon, with the direction of movement of the tape being from left to right, that is, in the direction from supply reel 172 toward take-up reel 173. In order to drive take-up reel 173 in the direction for winding tape thereon in the normal-forward operating mode of the apparatus, the tape driving or transport means of the apparatus is further shown to include a belt-tensioning pulley 166 and a coaxial idler wheel 167 which are fixed on a shaft 168 rotatably supported by one end 170a of a lever 170 which is pivotally mounted, intermediate its ends, on a pivot pin 169 extending from the chassis. A spring 171 is connected between lever 170 and the chassis for urging lever 170 in the counterclockwise direction to the position shown on FIG. 4 in which tensioning pulley 166 bears against belt 165 so as to tension the latter and be driven thereby, while the similarly rotated idler wheel 167 frictionally engages a rim on the take-up reel drive hub 176 for rotating the latter in the direction winding the tape on the take-up reel 173.

The tape recording and/or reproducing apparatus is, of course, provided with suitable conventional mechanisms by which lever 170 supporting tensioning pulley 166 and idler wheel 167 is permitted to be moved by spring 171 to the position shown on FIG. 4 when the normal-forward operating mode is selected by actuation of push-button 1, and by which lever 170 is turned in the clockwise direction from the position shown on FIG. 4 for separating idler wheel 167 from the rim of reel drive hub 176 when either the rewind operating mode or the fast-forward operating mode is selected by actuation of the push-button 2 or 3. Such conventional mechanisms are further effective to cause relatively high speed rotation of reel drive hub 175 in the direction for winding the tape on supply reel 172 in the rewinding mode, and of reel drive hub 176 in the direction for winding the tape on take-up reel 173 in the fast-forward operating mode.

The illustrated tape recording and/or reproducing apparatus is further shown to have a so-called pause control device by which the transport or movement of tape 137 in the normal-forward operating mode for recording or reproducing can be temporarily halted while carriage 133 remains in its operative position for continued contact of head 135 with the tape. When such pause control device is made operative, pinch rollers 134a and 134b are moved in the directions of the arrows j and j' away from capstans 132a and 132b, for example, to the positions shown in broken lines on FIG. 4, so that the tape is no longer driven by the capstans, and lever 170 is turned in the clockwise direction for moving idler wheel 167 away from the rim of reel drive hub 176, for example, to the position shown in broken lines on FIG. 4, so that the driving of take-up reel 173 is also halted even though the apparatus otherwise remains in its normal-forward operating mode.

In the illustrated embodiment, the pause control device is shown to include a pause control button 141 (FIG. 5) which may be mounted adjacent the previously described mode selecting push-buttons 1–4, but which is provided with an independent conventional locking arrangement (not shown) by which pause control button 141 is made to be of the so-called "push-push" type. As shown on FIG. 5, pause control button 141 is mounted on a stem 141a slidable in a guide 141b so as to be movable between an elevated rest position, shown in full lines, and a depressed active positions, shown in broken lines. By reason of the previously mentioned independent locking arrangement, a first push or actuation of pause control button 141 moves the latter to its active position where it is automatically locked for continued operation of the pause control device independently of the mode selecting push-buttons 1–4, until a subsequent or second push or actuation of pause control button 141 releases the locking arrangement associated therewith to permit its return to the rest or inactive position of button 141 corresponding to the inoperative position of the pause control device.

As shown on FIGS. 4 and 6, the pause control device further includes pinch roller deactivating levers 147 arranged in vertical planes at the opposite sides of carriage 133 in back of the outer end portions of pinch roller supporting levers 143a and 143b, and being pivotally mounted on pins 148 carried by support lugs 146a and 146b. The upper end portions 147a of levers 147 are engageable against the outer end portions of levers 143a and 143b, and the lower end portions 147b of levers 147 project downwardly from carriage 133 through elongated slots 149 (FIG. 6) provided in the underlying chassis 131. A pair of actuating levers 150 and 151 arranged end-to-end are disposed under chassis 131 and extend laterally across carriage 133 thereabove. Actuating levers 150 and 151 are pivotally mounted, intermediate their respective ends, on pivot pins 152 and 153, respectively, depending from chassis 131 for swinging of levers 150 and 151 in a horizontal plane between the inoperative positions thereof shown in full lines on FIG. 4 and the operative positions shown in broken lines at 150' and 151'. The inner or adjacent ends 150a and 151a of levers 150 and 151 are overlapped or interfitted so that the swinging of lever 150 from its inoperative position to its operative position causes similar swinging of lever 151 from its inoperative position to its operative position. The outer end portions 150b and 151b of levers 150 and 151 extend under the lower end portions 147b of levers 147 and have upstanding abutments 154 and 155, respectively, which are engageable against the respective lower end portions 147b for causing levers 147 to turn in the clockwise direction, as viewed on FIG. 6. The outer end portion 150b of lever 150 is pivotally connected to an actuating rod 158 (FIGS. 4 and 5) which is suitably mounted for longitudinal sliding movement. The forward end of actuating rod 158 (FIG. 5) is pivotally connected to one arm 157a of a bellcrank 157 which is pivotally supported on a pin 156 for swinging in a vertical plane, and which has its other arm 157b extending under, and being engaged by an abutment 141c at the lower end of stem 141a of pause control button 141. A spring 159 is connected to bellcrank 157 for urging the latter in the clockwise direction, as viewed on FIG. 5, and thereby urging pause control button 141 to its elevated rest position. The back end portion of actuating rod 158 has an arm 158a (FIG. 4) extending therefrom and being engageable with a pin 174 carried by end portion 170b of lever 170 which is remote from tensioning pulley 166 and idler wheel 167.

With pause control button 141 in its elevated rest position, spring 159 urges bellcrank 157 to the position shown in full lines on FIG. 5 with the result that connecting rod 158 is displaced rearwardly to its inoperative position shown in full lines on FIG. 4. In such inoperative position of connecting rod 158, the arm 158a thereof engageable by pin 174 permits lever 170 to be urged by spring 171 to the position shown in full lines at which idler wheel 167 engages the rim of take-up reel drive hub 176 in the normal-forward operating mode of the apparatus. Further, in its inoperative position, connecting rod 158 moves actuating lever 150 to its inoperative position against a stop pin 160 which depends from chassis 133 and which, incidentally, limits the rearward movement of actuating rod 158 by spring 159. The disposition of actuating lever 150 in its inoperative position permits the companion actuating lever 151 to also assume its inoperative position. In the inoperative positions of actuating levers 150 and 151, the abutments 154 and 155 on the outer end portions of such actuating levers assume relatively rearward positions so that, when carriage 133 is moved to its operative position, as shown on FIGS. 4 and 6, levers 147 are free to assume substantially vertical orientations, as shown in full lines on FIG. 6, and thereby permit pinch roller supporting levers 143a and 143b to be moved by springs 145a and 145b to the positions shown in full lines on FIG. 4 and at which the respective pinch rollers bear against capstans 132a and 132b with the tape therebetween.

When pause control button 41 is depressed to its active position shown in broken lines on FIG. 5, bellcrank 157 is angularly displaced in the counterclockwise direction to the position shown in broken lines, and actuating rod 158 is moved forwardly in the direction of the arrow h. Such movement of actuating rod 158 in the direction of the arrow h to its operative position shown in broken lines on FIG. 4 causes pivoting of lever 170 to the position shown in broken lines by reason of the engagement of arm 158a with pin 174, with the result that idler wheel 167 is separated from the rim of reel drive hub 176 so that the rotation of take-up reel 173 is halted. Further, as a result of the movement of actuating rod 158 to its operative position, actuating levers 150 and 151 are angularly displaced to their operative positions indicated in broken lines at 150' and 151' on FIG. 4. During such movement of actuating levers 150 and 151 to their operative positions, abutments 154 and 155 thereon move forwardly, that is, in the direction of the arrow i on FIG. 6, for similarly moving the lower end portions 147b of levers 147, with the result that the latter are angularly displaced to the positions indicated in broken lines at 147' on FIG. 6. As a result of the angular displacement of levers 147, the upper end portions 147a thereof act rearwardly against the outer end portions of pinch rollers supporting levers 143a and 143b for pivoting the latter in the directions of the arrows j and j' to the positions indicated in broken lines at 143a' and 143b' on FIG. 4, and at which the respective pinch rollers 134a and 134b are spaced from capstans 132a and 132b, respectively, for halting the driving of the tape by the capstans. Thus, although push-button 1 remains locked in its active position for establishing the normal-forward operating mode of the apparatus with carriage 133 in its operative position, the transport or movement of the tape is temporarily halted so long as pause control button 141 remains locked or latched in its active position.

If pause control button 141 is again actuated or depressed while push-button 1 remains locked in its active position for establishing the normal-forward operating mode, such second actuation of pause control button 141 releases the locking action thereon so that button 141 can be returned to its elevated rest position in response to the turning of bellcrank 157 in the clockwise direction, as viewed on FIG. 5, by the force of spring 159. Such turning of bellcrank 157 returns actuating rod 158 rearwardly to its inoperative position shown in full lines on FIG. 4, whereupon spring 171 can turn lever 170 on the counterclockwise direction for again engaging idler wheel 167 with the rim of reel drive hub 176 and thereby rotating take-up reel 173 in the direction winding the tape thereon. Simultaneously with the foregoing, the movement of actuating rod 158 rearwardly to its inoperative position returns actuating levers 150 and 151 to their inoperative positions with the result that abutments 154 and 155 move rearwardly away from the lower end portions 147b of levers 147, and springs 145a and 145b are then free to pivot the respective pinch roller supporting levers 143a and 143b in the directions for engaging pinch rollers 134a and 134b with the related capstans 132a and 132b for renewing the driving of the tape therebetween.

Since the locking arrangement for pause control button 141 is independent of the locking arrangement for the operating mode selecting push-buttons 1, 2 and 3, the pause control device made operative while the tape recording and/or reproducing apparatus is in its normal-forward operating mode, may remain in such operative condition even when the stop pushbutton 4 is actuated to return the apparatus to its neutral or stop mode in which carriage 133 is moved forwardly by spring 140 to its inoperative position. If, while the pause control device remains in its operative condition, the normal-forward operating mode of the apparatus is re-established, the resulting movement of carriage 133 in the direction of the arrow $f$ toward its operative position shown on FIG. 4 would result in the undesirable impact or clashing of the lower end portion 147b of levers 147 against abutments 154 and 155 on actuating levers 150 and 151 in their operative positions prior to the arrival of carriage 133 at its operative position. During the remaining movement of carriage 133 to its operative position, relatively large angular displacements of levers 143a and 143b would have to be effected by the motive force of solenoid P against the resistance of springs 145a and 145b. Such clashing engagement or impact of levers 147 with abutments 154 and 155 and the additional resistance of springs 145a and 145b to the movement of carriage 133 to its operative position are undesirable, and damage to the apparatus may result therefrom.

In order to avoid the establishment of the normalforward operating mode of the apparatus at any time when the pause control device is already in its operative condition, the apparatus of FIGS. 4, 5 and 6 is provided with a mode selecting device according to this invention as shown on FIG. 7, and which may be generally similar to that previously described with reference to FIGS. 1A, 1B and 2. However, such mode selecting device is shown on FIG. 7 to further comprise switches $S_4$ and $S_5$ which are connected in parallel between switch $S_2$ and time constant circuit TC. Switch $S_4$ has a normally OFF state and is mounted adjacent carriage 133 (FIG. 4) so as to be changed-over to its ON state by an actuator 133b on carriage 133 when the latter is in its operative position, that is, when the apparatus is in its normalforward operating mode. On the other hand, switch $S_5$ has a normal ON state and may be mounted adjacent the path of travel of the abutment 141c on the stem 141a of pause control button 141 so as to be changed-over to its OFF state in response to the presence of pause control button 141 in its depressed or active position.

It will be understood that, when pause control button 141 is in its elevated rest position, that is, when the pause control device is in its inoperative condition, switch $S_5$ remains in its ON state so that a closed circuit is provided between switch $S_2$ and time constant circuit TC without regard to the condition of switch $S_4$, so that the mode selecting device illustrated by FIGS. 4-7 operates in the same manner as the mode selecting device of FIGS. 1A, 1B and 2.

If pause control button 141 is moved to its active position for effecting operation of the pause control device, as previously described, at a time when the tape recording and/or reproducing apparatus is in its normal-forward operating mode, switch $S_5$ is changed-over to its OFF state in response to actuation of button 141, while switch $S_4$ has been previously changedover to its ON state in response to the presence of carriage 133 in its operative position for the normal-forward operating mode of the apparatus. Thus, current continues to be supplied to time constant circuit TC through switches $S_1$, $S_2$ and $S_4$, with the result that transistor $T_{r1}$ remains in its ON state for continuing the energizing of solenoid P and maintaining the apparatus to its normal-forward operating mode.

However, if pause control button 141 remains locked in its active position for establishing the operative condition of the pause control device and stop push-button 4 is actuated for releasing locking plate 10 so that push-button 1 can return to the elevated rest position thereof for restoring the tape recording and/or reproducing apparatus to its neutral or stop mode, the return of carriage 133 to its inoperative position by spring 140 permits switch $S_4$ to return to its normal OFF state, while switch $S_5$ continues in its OFF state by reason of button 141 being locked in its active position. In the foregoing situation, both switches $S_4$ and $S_5$ are simultaneously in their OFF states to open the circuit between switch $S_2$ and time constant circuit TC. Further, in response to the actuation of stop push-button 4, switch $S_1$ is momentarily changed over to its ON state for turning On transistor $T_{r2}$ to discharge capacitor $C_1$, with the result that transistor $T_{r1}$ is turned OFF to de-energize solenoid P. Thereafter, upon the actuation of any one of the operating mode selecting push-buttons 1, 2 and 3, the resulting change-over of switch $S_2$ to its ON state cannot cause current to flow to time constant circuit TC and, therefore, transistor $T_{r1}$ remains in its OFF state and the energizing of solenoid P for establishing the operating mode of the apparatus is prevented. Thus, so long as pause control button 141 remains locked in its active position, the actuation of push-button 1 to its active position for selecting the normal-forward operating mode of the apparatus cannot cause movement of carriage 133 to its operative position. When, however, pause control button 141 is again actuated or pressed downwardly to release the locking action thereon and permit spring 159 to return the pause control device to its inoperative condition, switch $S_5$ is restored to its normal ON state with the result that current can flow through switches $S_1$, $S_2$ and $S_5$ to time constant circuit TC. When such current flows, the change-over of transistor $T_{r1}$ to its ON state is achieved after the previously described time delay, whereupon solenoid P is energized to supply the motive force for establishing the normal-forward operating mode, or any other of the operating modes of the apparatus that may have been previously selected by the actuation of the respective one of push-buttons 1, 2 and 3 to its active position.

Figure 7:
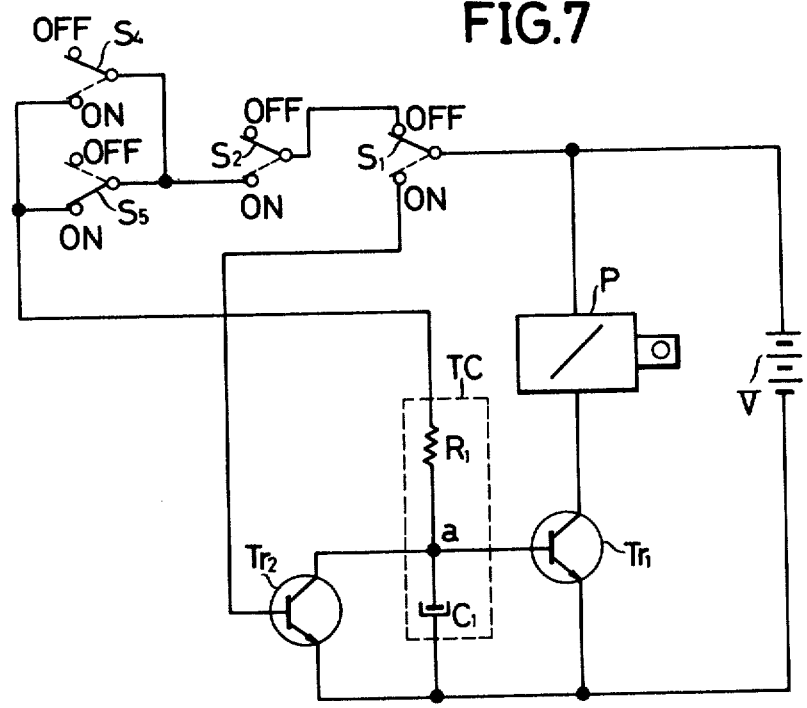
FIG. 7 is a circuit diagram of the mode selecting device according to this invention which incorporates the pause control device shown on FIGS. 4, 5 and 6.

On FIG. 7, the additional switches $S_4$ and $S_5$ are shown included in a circuit of the type illustrated on FIG. 2, but it will be apparent that such additional switches can also be included between the switch $S_2$ and the time constant circuit TC in the circuit shown on FIG. 3 so that the resulting mode selecting device would be also responsive to the presence or absence of the cassette 130 on the tape recording and/or reproducing apparatus.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention as defined in the appended claims.

What is claimed is:

1. A mode selecting device for a tape recording and/or reproducing apparatus: comprising a plurality of push-button means, each selective actuation from a rest position to an active position for selecting corresponding operating modes of the apparatus; a plurality of movable transmission member means respectively corresponding to said push-button means each mounted for movement from a normal rest position to an operative position; electrically energized driving means for mechanically driving, when energized, the selected one of said transmission member means to cause the movement of said selected transmission member means to its operative position responsive to the selective actuation of the corresponding push-button means to its active position; electrically controllable first switch means having ON and OFF states and being connected with said driving means for energizing the latter when said first switch means is in said ON state; circuit means for controlling said first switch means including second switch means having a normal OFF state and being changed-over to, and retained in an ON state in response to actuation of any one of said push-button members, and delaying means having an initial condition for establishing said OFF state of said first switch means and being changed to an altered condition a predetermined time after said second switch means has been changed-over to said ON state of the latter for establishing said ON state of said first switch means; and third switch means having a normal OFF state and being temporarily changed-over to an ON state for restoring said delaying means to said initial condition in response to actuation of any one of said push-button members.

2. A mode selecting device according to claim 1; in which said delaying means includes a time constant circuit consisting of a resistor and a capacitor which is substantially discharged in said initial condition and which is charged through said resistor in response to said ON state of said second switch means so as to carry a substantial electrical charge in said altered condition for establishing said ON state of the first switch means; and in which said third switch means, when in said ON state of the latter, is operative to substantially remove said charge from said capacitor.

3. A mode selecting device according to claim 2; in which said driving means includes a solenoid, and said first switch means includes a transistor having a collector-emitter path connected with said solenoid and a base connected with said delaying means so that said collector-emitter path is rendered conductive in response to said substantial electrical charge carried by said capacitor in said altered condition of the delaying means.

4. A mode selecting device according to claim 2; in which said third switch means includes a transistor having a base and a collector-emitter path connected in parallel with said capacitor for substantially removing said charge from the capacitor when said collector-emitter path is rendered conductive, and a mechanically actuated switch having a normal position and a changed-over position to which it is temporarily displaced in response to said actuation of any one of said push-button means for applying a potential to said base of the transistor by which said collectoremitter path is rendered conductive for establishing said ON state of said third switch means.

5. A mode selecting device according to claim 2; further comprising detecting means for detecting the absence of a tape cassette from the apparatus and, in response thereto, retaining said third switching means in said ON state for maintaining said delaying means in said initial condition so long as said detecting means detects the absence of a tape cassette, whereby to prevent the establishment of an operating mode of the apparatus when a tape cassette is not positioned thereon.

6. A mode selecting device according to claim 5; in which said third switch means includes a transistor having a base and a collector-emitter path connected in parallel with capacitor for substantially removing said charge from the capacitor when said collector-emitter path is rendered conductive, and a mechanically actuated switch having a normal position and a changed-over position to which it is temporarily displaced in response to said actuation of any one of said push-button means for applying a potential to said base of the transistor by which said collector-emitter path is rendered conductive for establishing said ON state of said third switch means; and in which said detecting means includes a switch having a normal position, at which said potential is applied to said base of the transistor of the third switch means, and a changed-over position to which said switch of the detecting means is displaced in response to the positioning of a tape cassette on the apparatus.

7. A mode selecting device according to claim 1; further comprising detecting means for detecting the absence of a tape cassette from the apparatus and, in response thereto, retaining said third switching means in said ON state for maintaining said delaying means in said initial condition so long as said detecting means detects the absence of a tape cassette whereby to prevent the establishment of an operating mode of the apparatus when a tape cassette is not positioned thereon.

8. A mode selecting device according to claim 1; further comprising a stop push-button means which is selectively actuable for returning the apparatus from any one of said operating modes to a stop mode and locking means engageable for retaining any one of said plurality of push-button means in said active position and being moved to a disengaged position in response to actuation of said stop push-button means and in response to actuation of any one of said plurality of push-button means from its rest position toward its active position for permitting any of said plurality of pushbutton means previously in the active position thereof to return to said rest position; and in which said third switch means is actuable by said locking means from said normal OFF state to said ON state in response to movement of said locking means to said disengaged position.

9. A mode selecting device according to claim 8; further comprising a switch actuator for said second switch means movable between rest and active positions corresponding to said OFF and ON states, respectively, of said second switch means, and cooperative means on each of said plurality of push-button means and on said switch actuator for moving the latter to said active position thereof in response to the actuation of any one of said plurality of push-button means to said active position of the latter.

10. A mode selecting device according to claim 1; in which one of said plurality of push-button means is for selecting a normal forward operating mode of the apparatus; and further comprising fourth and fifth switch means connected in parallel with each other between said second switch means and said delaying means and each having ON and OFF states, means for changing-over said fourth switch means from its normal OFF state to its ON state when said apparatus is in said normal forward operating mode, a pause push-button means which is selectively actuable for causing a pause in the normal forward operation of the apparatus while the latter remains in said normal forward operating mode, and means for changing-over said fifth switch means from its normal ON state to its OFF state in response to actuation of said pause push-button means.

11. A tape recording and/or reproducing apparatus comprising tape transport means for transporting a tape during various operating modes of the apparatus; a plurality of push-button means, each selective actuation from a normal rest position to an active position for selecting corresponding operating modes of the apparatus; a plurality of movable transmission member means respectively corresponding to said push-button means each mounted for movement from a normal rest position to an operative position; electrically energized driving means for mechanically driving, when energized, the selected one of said transmission member means to cause the movement of said selected transmission member means to its operative position responsive to the selective actuation of the corresponding push-button means to its active position; locking means operative to retain any one of said push-button members in said active position thereof and being released in response to the actuation of any one of said push-button members from said rest position thereof; and means operative in response to actuation of any one of said push-button members from said rest position to said active position thereof for energizing said driving means with a predetermined time delay from the release of said locking means to the energizing of said driving means so that, in the event that two of said push-button members are actuated in succession within said predetermined time delay, said driving means is energized only to drive the one of said transmission members corresponding to the last actuated pushbutton member.

12. A tape recording and/or reproducing apparatus according to claim 11; in which said tape transport means transports a tape contained in a cassette positioned on the apparatus; and further comprising detecting means for detecting the presence and absence of a cassette on the apparatus, and means responsive to said detecting means for permitting the energizing of said driving means with said time delay only when the presence of a cassette on the apparatus is detected.

13. A tape recording and/or reproducing apparatus according to claim 12; in which one of said plurality of pushbutton means is for selecting a normal forward operating mode of the apparatus; and further comprising pause control means actuable for temporarily halting the transporting of the tape by said tape transport means in said normal forward operating mode of the apparatus, and means operable to prevent the energizing of said driving means when any one of said plurality of pushbutton members is actuated with said pause control means already in its actuated condition.

14. A tape recording and/or reproducing apparatus according to claim 11; in which one of said plurality of pushbutton means is for selecting a normal forward operating mode of the apparatus; and further comprising pause control means actuable for temporarily halting the transporting of the tape by said tape transport means in said normal forward operating mode of the apparatus, and means operable to prevent the energizing of said driving means when anyone of said plurality of push-button means is actuated with said pause control means already in its actuated condition.

* * * * *